COLOR TELEVISION DETECTOR SYSTEM

Filed Dec. 30, 1954 2 Sheets-Sheet 1

INVENTOR.
David D. Holmes
BY
[signature]
ATTORNEY

COLOR TELEVISION DETECTOR SYSTEM

Filed Dec. 30, 1954 2 Sheets-Sheet 2

INVENTOR.
David D. Holmes
BY
[signature]
ATTORNEY

United States Patent Office 2,917,573

Patented Dec. 15, 1959

2,917,573

COLOR TELEVISION DETECTOR SYSTEM

David D. Holmes, Princeton, N.J., assignor to Radio Corporation of America, a corporation of Delaware Application December 30, 1954, Serial No. 478,672

11 Claims. (Cl. 178—5.4)

The present invention relates to improvements in color television systems and particularly to improvements in non-linear signal combining means suitable for use in realizing the subject improvements in color television systems.

In color television receivers suitable for reception and reproduction of standard color television signals it has been the practice to heterodyne the radio frequency signal bearing composite color television signal modulation in a superheterodyne detector stage to produce an intermediate frequency version of the color television radio frequency signal. After amplification the intermediate frequency signal is applied to an amplitude demodulation circuit which yields a video frequency version of the complex color television signal. This demodulated signal occupies a video frequency band of approximately 0–4 mc. and contains color television luminance components and chrominance components. Chrominance is represented by what may be termed a suppressed carrier type color subcarrier situated in the upper frequency end of the video spectrum occupied by the composite color television signal. This color subcarrier is amplitude and phase modulated in accordance with color difference information which when in turn demodulated will produce electrical signals depicting the difference between the color television scene as transmitted and a black and white (monochrome) version of the same scene. The frequency of the color subcarrier bearing chrominance information is chosen such that the sideband components of the color subcarrier fall in certain zero energy "slots" in the luminance signal resulting from the periodic nature of the television scene line scansion.

Demodulation of the chrominance component is accomplished by applying the color subcarrier and its sidebands to a non-linear signal combining means which mixes a synchronized continuous wave color demodulation signal with the color subcarrier and sidebands. The continuous wave synchronous color demodulating signal is locally generated in the color television receiver and is held at a frequency corresponding to the mean frequency of the color subcarrier. The color subcarrier as transmitted is modulated on a suppressed carrier basis so that in the absence of color information no color subcarrier components in the composite color television signal is present. It is therefore desirable in the color television receiver that the non-linear signal combining means acting as a demodulator for the chrominance information be of a type in which the continuous wave synchronous color demodulation signal per se is absent from the output signal of the demodulator. The products of synchronous demodulation are referred to as color difference signals which may be combined with luminance information to produce direct color signals suitable for direct application to the control electrode of a color television picture reproducing tube. It is well known that the continuous wave signal source itself may take a variety of forms and may be synchronized or frequency controlled by the color burst component of the standard composite color television signal.

The processing of a color television signal within a color television receiver is therefore accomplished in several steps: first, converting the received radio frequency signal to an intermediate frequency signal; second, amplitude demodulating the intermediate frequency signal to produce a composite color television signal; third, synchronously demodulating the chrominance component of the composite color television signal to produce color differences and ultimately direct color signals. It is inherent in the present FCC approved color television system that any phase error or shift in the chrominance component signals relative to luminance component signals will produce errors in the reproduced color. It has therefore been found that the use of amplifier stages between the intermediate frequency signal demodulator to the synchronous demodulator makes possible an undesirable change in color fidelity as the phase characteristics of such amplifier change with temperature and tube aging.

It is therefore an object of the present invention to provide improved means for processing received color television signals so as to minimize fluctuation in color fidelity as a function of changes in amplifier characteristics.

It is another object of the present invention to provide an improved color television signal demodulating system in which improved stability in color fidelity is realized.

In accordance with the present invention the intermediate frequency version of the received color television signal is applied to a non-linear signal combining or demodulating circuit to which is applied the continuous wave synchronous color demodulating signal whereby both amplitude demodulation of the intermediate frequency signal and synchronous demodulation of the chrominance component is accomplished in a single stage. This acts to eliminate the possibility of erroneous phase changes between luminance signals and chrominance signals prior to synchronous demodulation of the luminance component. By employing a balanced type of signal demodulator circuit it is possible, in accordance with the present invention, to control the degree of unbalance in the circuit so as to provide a direct color signal from the aforedescribed simultaneous amplitude and synchronous demodulation of the color television signal.

Since in most circuits for providing non-linear signal combination and demodulation it has been the practice to employ passive diode elements, such demodulator circuits become passive in nature and do not therefore contribute amplification to the received signal or the products of its demodulation.

It is therefore an object of the present invention to provide an improved signal combining means suitable for non-linearly combining two electrical signals in such a way that the products of combination are amplified.

It is further an object of the present invention to provide an improved signal combining circuit suitable for use in color television signal demodulation in which synchronous demodulation of the chrominance component and amplitude demodulation of the luminance component is effectuated in a single stage embodying complementary transistor circuitry whereby either direct color signals or color difference signals may be developed directly from the intermediate frequency version of the amplified color signal.

Therefore in accordance with another aspect of the present invention a novel signal combining circuit is provided in which a semiconductor amplifier is permitted to simultaneously synchronously demodulate and amplitude demodulate a received color television signal and at the same time impart a signal gain to the products of demodulation.

In another phase of the present invention semiconductor amplifiers having complementary characteristics are connected in a balanced demodulator bridge arrangement in which the non-linear combination of any type of signals may be achieved on a balanced basis yet imparting a signal gain to the products of such signal combination.

A more complete understanding of the present invention as well as its many objects and features of advantage may be had through a reading of the following specification, especially when taken in combination with the accompanying drawings in which.

Figures 1, 2:
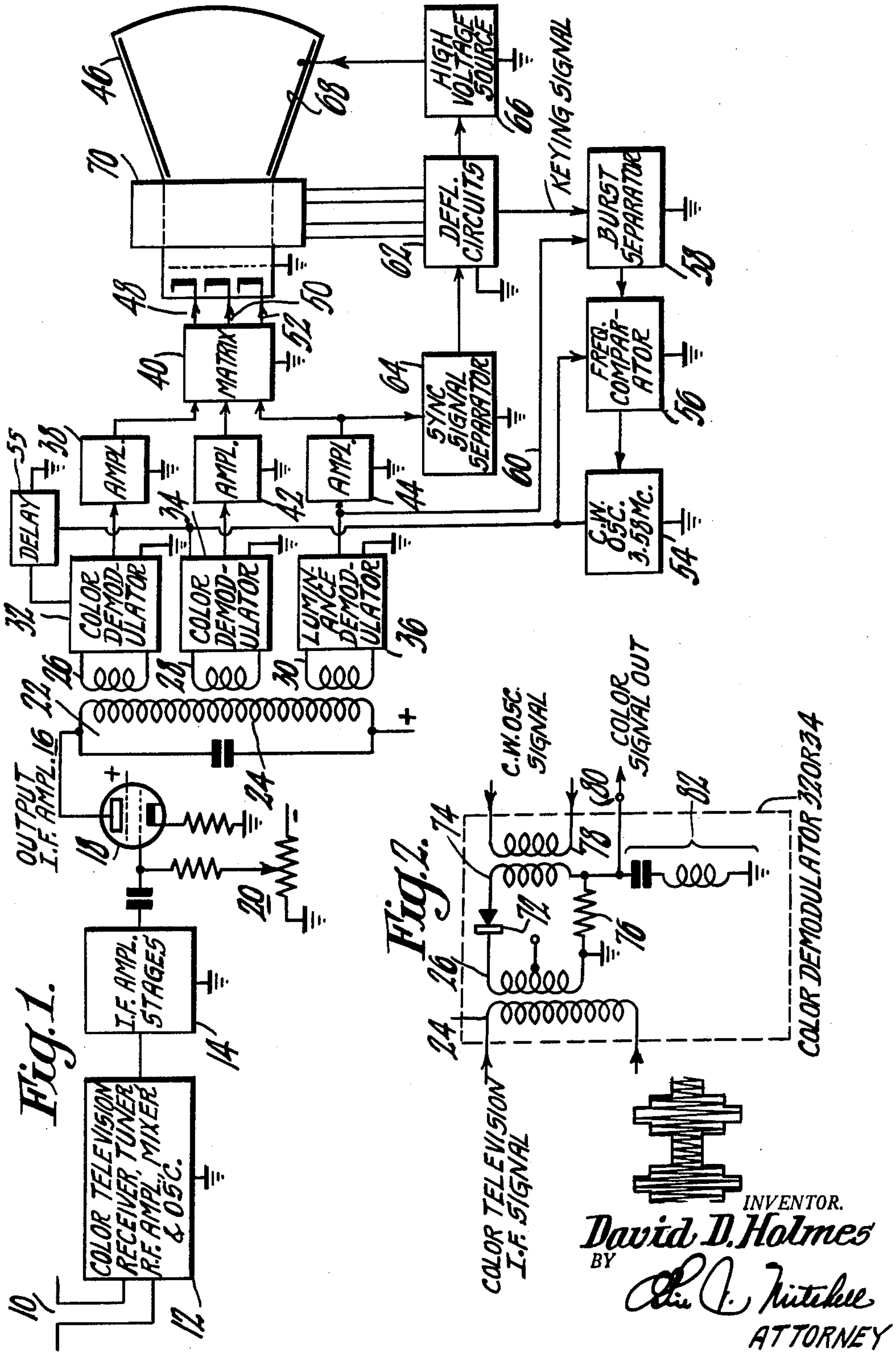
Fig. 1 is a combination block and schematic representation of a color television receiving system in which the present invention finds embodiment.
Fig. 2 is a schematic representation of a simplified form of signal demodulating circuit suitable for use in the embodiment of the invention shown in Fig. 1.

Turning now to Fig. 1, there is indicated at 10 a television receiving antenna suitable for delivering to the color television receiver tuner 12 a radio frequency carrier bearing standard FCC approved composite color television signal modulation. The tuner 12 includes the well known superheterodyne R.F. amplifier mixer and oscillator. Output signal from the tuner 12 is applied to the intermediate frequency amplifier stage 14, whose output signal is capacitively coupled to the output amplifier stage 16. The output I.F. amplifier stage 16 is shown to comprise a vacuum tube amplifier 18, the gain of which may be manually controlled by means of an adjustable bias source 20. Output signal from the I.F. amplifier is developed across the tuned circuit 22.

In accordance with the present invention, the tuned circuit 22 comprises a winding 24 which acts as the primary winding of an intermediate frequency transformer having secondary windings 26, 28 and 30. Intermediate frequency signals induced in the secondary windings 26, 28 and 30 are applied to the synchronous color demodulators 32 and 34 and a luminance demodulator 36. Output signal from the color demodulator 32 is applied through an amplifier 38 to a standard color matrix circuit 40. Color information provided by the demodulator 34 is applied to the matrix 40 through amplifier 42.

Luminance information from the demodulator 36 is applied to the matrix 40 through amplifier 44. In accordance with well known signal mixing techniques the chrominance information and luminance information is combined in the matrix 40 to produce direct color signals which are applied to the color reproducing tube 46 via circuit paths 48, 50 and 52. The color reproducing tube 46 may be of the conventional trinescope variety.

In accordance with the present invention a continuous wave synchronous demodulating signal is applied to the color demodulators 32 and 34 from the continuous wave oscillator 54. A suitable delay circuit 55 is interposed between the demodulator 32 and the oscillator 54 in accordance with well-known practice. The continuous wave oscillator 54 is conventionally synchronized by a control signal developed by the frequency comparator circuit 56. The frequency comparator circuit 56 is applied with separated color burst information from the burst separator 58 as well as a sample of the continuous wave synchronous demodulating signal developed by the oscillator 54. The burst separator 58 is in turn supplied with luminance information via circuit path 60 and a keying signal from the deflection circuit 62. The keying signal supplied to the burst separator may be conventional in nature and in effect produces sampling of the luminance signal during the "back porch" interval of the horizontal deflection synchronizing pedestal wave form during which color burst information is transmitted. Luminance signal is also supplied to the synchronizing signal separator 64 which separates horizontal and vertical synchronizing signals from the luminance component of the color television signal for application to the deflection circuits 62. The high voltage power supply circuit 66 is shown coupled in a conventional manner with the deflection circuits 62 to provide a beam accelerating potential to the anode 68 of the color tube 46. The deflection circuit 62 are also shown coupled with the beam deflection yoke 70 which may be conventional in nature.

The arrangement shown in Fig. 1 differs from conventional color television receiving systems in that the color demodulators 32 and 34 are indicated as a single circuit means connected to receive what may be made to represent full band width intermediate frequency signals from the output I.F. amplifier 16. Continuous wave synchronous demodulating signal from the oscillator 54 is also directly applied to the color demodulators 32 and 34. In accordance with the present invention the frequency of the continuous wave synchronous demodulating signal is established within the video frequency spectrum occupied by the composite television signal borne by the intermediate frequency carrier. By this means the intermediate frequency version of the received radio frequency color television signals is both amplitude demodulated and synchronously demodulated in a single stage whereby to minimize the opportunity for phase shift between luminance and chrominance information prior to chrominance demodulation.

The actual form of the color demodulator circuit suitable for use in blocks 32 and 34 of Fig. 1 may be varied. The circuitry for the color demodulators 32 and 34 may in accordance with the present invention be identical. The non-linear signal combining circuits shown in Figs. 2 through 7 are suitable for application in either block 32 or block 34 of Fig. 1.

In Fig. 2 the color demodulator circuit comprises a diode 72 connected across the secondary winding 26 through the combination of a winding 74 and load resistor 76. The winding 74 comprises injection means for the continuous wave signal developed by the oscillator 54 and by way of example is indicated as being the secondary winding of a transformer whose primary winding 78 is connected with the oscillator 54. The oscillator 54 has been indicated in the drawing as having an approximate frequency of 3.58 mc. In accordance with that aspect of the present invention dealing with color signal demodulation the synchronous demodulating signal is established in the video frequency range of the color television signal and is actually combined on a non-linear basis with the relatively higher intermediate frequency version of the received color signal. The products of signal combination in Fig. 2 are developed across the load resistor 76 and made available at output terminal 80 for application to a color matrix or color tube. The series tuned circuit 82 may be used to act as a trap for the continuous wave signal from the oscillator 54 and when employed is made to resonate at the frequency of the oscillator 54.

A particular feature of the present invention as shown in Fig. 2 is that the signal developed at the output terminal 80 may be either a color difference signal or a direct color signal depending upon the band pass characteristics of the intermediate frequency amplifier stage preceding the color demodulator. For example, if the output I.F. amplifier 16 is considered to form a part of an over-all wide band staggered tuned I.F. amplifying system and is itself tuned to handle amplification of mainly those I.F. frequencies corresponding to chrominance information, manual control of the bias on tube 18 and hence the gain of the output I.F. amplifier provides means for adjusting the relative amplitude of luminance information to chrominance information. In this manner the output signal available at terminal 80 in Fig. 2 may be made to represent the combination of both demodulated luminance and chrominance information in just that ratio which will produce the well known direct color signal suitable for application directly to a color reproducing tube thereby eliminating the need for the matrix 40 shown in Fig. 1. On the other hand, should the intermediate frequency signal applied to the arrangement of Fig. 2 be restricted in band width to correspond only to chrominance information, the output signal at terminal 80 will correspond to a color difference signal, since no luminance components will be represented. The color difference signal is appropriately applied to a matrix as shown in Fig. 1.

Figure 3:
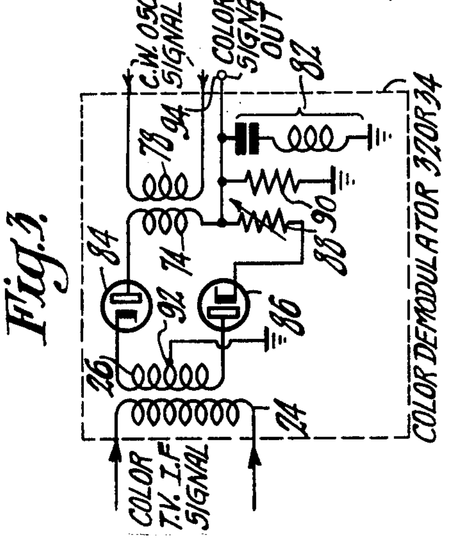
Fig. 3 is still another form of signal demodulator circuit suitable for use in the embodiment of the invention shown in Fig. 1.

In Fig. 3 two diodes 84 and 86 are employed for demodulation of the intermediate frequency signal. These diodes are connected in series across the secondary winding 26 through the oscillator injection winding 74 and an adjustable balancing resistor 88. The load resistor 90 is connected between the junction of the winding 74 and resistor 88 to the center tap 92 on the transformer secondary winding 26. By way of convenience this latter connection is shown to include the path defined by circuit ground. The series tuned circuit 82 may again be tuned to trap out any residual oscillator signal which may appear across the load resistor 90. If full band width intermediate frequency signal is applied to the demodulator the balancing resistor 88 may be used to provide either a direct color signal or a color difference signal at the output terminal 94 of the circuit. This is made possible as follows. If the circuit impedance between the center tap 92 and the terminal 94 through each of the diodes 84 and 86 is the same, I.F. signal amplitude variations (corresponding to luminance information) will produce no net current flow through the load resistor 90. Thus no luminance signal will in fact be demodulated by the circuit. Phase comparison information due to the interjecting of the continuous wave synchronous demodulating signal from the oscillator 54 will however produce a net current flow through resistor 90 due to phase comparison in that branch of the circuit involving the injection winding. Under the assumed conditions of balance in the circuit wherein luminance components are cancelled, the signal developed at terminal 94 will correspond to color difference information only. This color difference information will depict both amplitude and phase variations in the received suppressed color information carrier since when the circuit is balanced the magnitude of signal across the load resistor 90 will be a function of both the amplitude of the received color subcarrier as well as its phase relative to the signal provided by the oscillator 54.

In the arrangement of Fig. 3 it is also understood that the balance resistor 88 may be adjusted to intentionally unbalance the circuit thereby causing a net current flow through resistor 90 as a result of amplitude demodulation of intermediate frequency luminance signal. By varying the degree of unbalance the signal developed at output terminal 94 may be made to represent a predetermined ratio of luminance and chrominance information which taken together constitute a direct color signal suittable for direct application to a color reproducing tube. The development of the direct color signal would of course obviate the need for the matrix 40 should this be desired.

Figure 4:
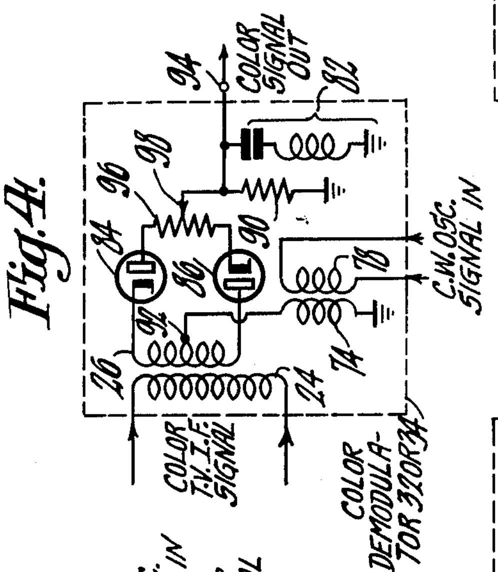
Fig. 4 is a schematic representation of yet another form of the invention shown in Fig. 1.

The arrangement of Fig. 4 is similar to Fig. 3 with the exception that the continuous wave synchronous demodulating signal is applied in series with both diodes instead of only one diode. In Fig. 4 the diodes 84 and 86 are connected across the secondary winding 26 through a direct current conducting means such as the potentiometer 96. The potentiometer 96 functionally takes the place of the balancing resistor 88 in Fig. 3. By positioning the tap 98 on the potentiometer 96, current load through the load resistor 90 corresponding to amplitude variations in the intermediate frequency signals may be cancelled. The net output voltage available at terminal 94 in Fig. 4 will then represent only phase comparison information between the continuous wave demodulating signal and the color subcarrier. By positioning the potentiometer tap so as to produce unbalance in the circuit a direct color signal may be realized in accordance with the principles discussed in connection with the embodiment shown in Fig. 3.

The color demodulator circuits illustrated in Figs. 2, 3 and 4, suitable for use in carrying out the present invention, are characterized by the fact that signal demodulation takes place with no attending signal gain. It is another feature of the present invention to provide a non-linear mixing circuit suitable for signal modulation or demodulation and in which an effective amplification is imparted to the signal products resulting from such non-linear mixing.

Figure 5:
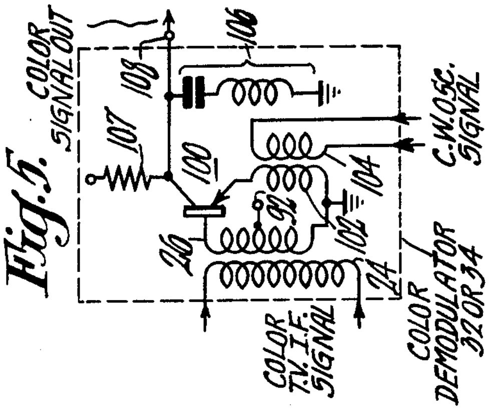
Fig. 5 is a schematic representation of a transistor type of signal combining circuit suitable for use in the embodiment of the invention of Fig. 1 in which, according to the present invention, a signal gain is imparted to the products of signal combination.

In Fig. 5 for example a transistor 100 is provided having its emitter-base input circuit connected across a secondary winding 26. Continuous wave synchronous demodulating signal is injected in the input circuit by means of the injection winding 102 which forms the secondary of transformer whose primary winding is connected with the continuous wave oscillator 54. A collector load resistor is connected between the transistor collector and a suitable biasing source. Again a tuned circuit such as 106 resonant at the oscillator frequency may be employed in shunt with the load resistor 107 to reduce the amplitude of continuous wave oscillator signal presented at the output terminal 108. In the operation of the arrangement in Fig. 5 the intermediate frequency signal appearing across the secondary winding 26 is demodulated by the non-linear characteristics of the transistor input circuit to produce luminance signal information across the output load resistor 107. Phase comparison information provided by comparing the local continuous wave oscillator signal with the subcarrier is also achieved in the input circuit to provide output signal information across the collector load resistor 107 which will correspond to chrominance information. By controlling the relative amplitude of chrominance and luminance intermediate frequency signals applied to the primary winding 24 the color signal developed at output terminal 108 may be made to represent direct color information. On the other hand, if the intermediate frequency signals applied to the primary winding 24 are restricted in band width to correspond only to chrominance information the circuit 55 will produce a color difference signal at the output terminal 108. In either event, the output signal at terminal 108 will represent an amplified version of the demodulation products produced in the input circuit of the transistor.

Figure 6:
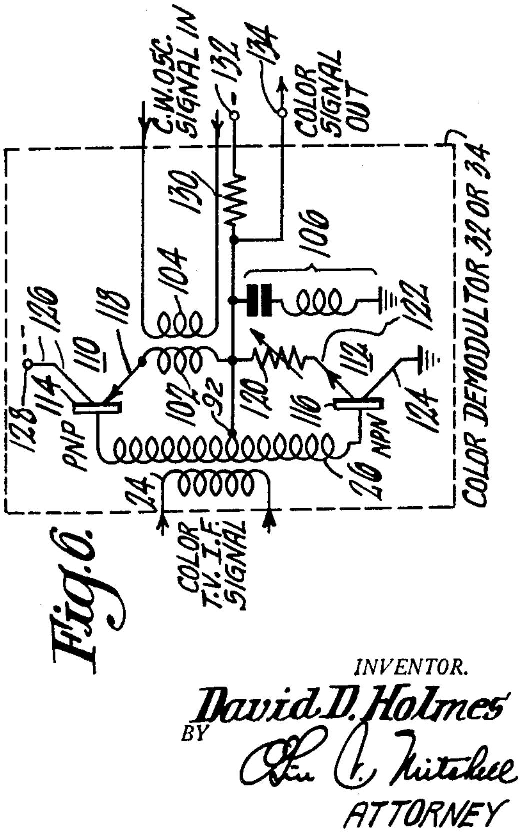
Fig. 6 is a schematic representation of still another form of signal combining circuit suitable for use as a demodulator in the embodiment of the invention shown in Fig. 1 and which imparts a signal gain to the products of signal combination.

In accordance with the present invention use may be made of the complementary characteristics of transistors to provide first the advantages of a balanced type of demodulator circuit and second the advantage of significant amplification. Such an arrangement is shown in Fig. 6. As shown in Fig. 6 the transistors 110 and 112 are complementary in characteristics. Purely by way of example, the transistor 110 is shown to be of the P–N–P type while transistor 112 is the N–P–N variety. Under these conditions the bases 114 and 116 of the transistors may be connected with the extremities of the secondary winding 26. The center tap 92 of the winding 26 is connected with the emitter 118 through the injection winding 102 to complete the input circuit for the transistor 110. The input circuit of transistor 112 comprises the connection of a balancing resistor 120 between the center tap 92 and the emitter 122. The collector 124 of transistor 112 is connected with circuit ground whereas the collector 126 of transistor 110 is connected with a negative potential bias source having a terminal at 128. The center tap 92 is also connected through an output load resistor 130 to another source of negative potential having a terminal at 132. The potential at 132 is indicated as being less negative with respect to circuit ground than the potential at 128.

In the operation of the embodiment of the present invention shown in Fig. 6 the balancing resistor 120 may be adjusted so that the input circuit current to each of the transistors will be the same in response to a given amplitude of intermediate frequency signal. Due to the complementary nature of the transistors and assuming the power gain of each transistor is the same, the net voltage developed across the load resistor 130, due to luminance amplitude variations in the intermediate frequency signal, will be zero. However, the continuous wave oscillator signal injected in the input circuit of the transistor 110 will result in color subcarrier phase and amplitude signal information appearing across the resistor 130. Under these conditions the color signal delivered at terminal 134 will correspond to a color difference signal. By unbalancing the circuit through adjustment of the balancing resistor 120 the signal at terminal 134 may be made to correspond to a direct color signal as described above in connection with the unbalancing of the circuit in Fig. 3.

Figure 7:
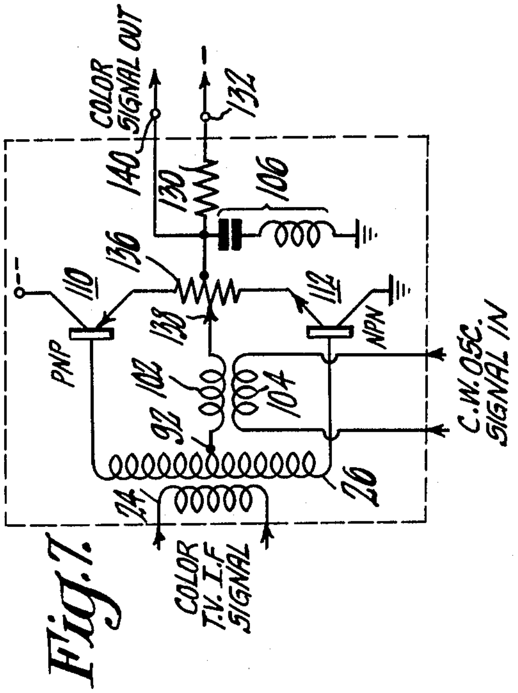
Fig. 7 is a schematic representation of still another form of signal combining circuit suitable for use as a demodulator in the embodiment of the invention shown in Fig. 1 and which also imparts a signal gain to the products of signal combination.

The advantages of complementary transistor signal amplification are also realized in the embodiment of the present invention shown in Fig. 7. The arrangement in Fig. 7 is substantially the same as shown in Fig. 6 with the exception that the injection winding 102 is positioned so as to be common to the input circuits of both transistors. The balancing means 120 in Fig. 6 is replaced by the potentiometer 136 in Fig. 7. The movable tap 138 may be positioned so as to balance out luminance signal components in the output resistor 130. Under such conditions the output signal delivered to output terminal 140 will represent only the amplitude of the received color subcarrier and phase comparison information between the subcarrier and the continuous wave oscillator signal delivered by the oscillator 54. Since the oscillator signal injection in Fig. 7 is common to both transistor input circuits the amplitude of demodulated color information will be greater than that provided by the arrangement of Fig. 6 under a given set of signal conditions. By unbalancing the circuit of Fig. 7 a luminance component may be also made to appear across the load resistor 130 so as to make possible the deliverance to the output terminal 140 of a direct color signal if desired.

It is noted that the non-linear signal mixing characteristics with attending signal gain of the circuit of Fig. 7 may find useful application in combining signals other than those involved in color television signal reception and image reproduction. For example, the demodulator circuit shown in Fig. 7 is capable of balanced modulator operation wherein the injection signal across winding 102 is balanced out so as to not appear in the signal delivered at the output terminal 140. The circuit action may be considered as a balanced demodulation of the color television intermediate frequency signal by the continuous wave synchronous oscillator signal provided by the oscillator 54. Since the signal injected into the emitter-base paths of the transistors 110 and 112 may be cancelled out, the circuit arrangement of Fig. 7 provides convenient means for modulating the injected signal with any type of intelligence information applied to the primary winding 22. Under balanced conditions the output signal at terminal 140 will represent only the side bands of the modulation products. For example, by a proper design of the transformer whose primary winding is 24 speech signals may be applied to the primary winding to result in the production of an amplified version of modulation sidebands resulting from the speech modulation of the continuous wave signal appearing across the injection winding 102. Also, by proper design of the coupling transformer the circuit arrangement of Fig. 7 may be made to produce a suppressed carrier type of modulation action which will permit the application of color television color difference signals to the primary winding 22 and a continuous wave signal at the color subcarrier frequency to the primary winding 104. The signals appearing at the output terminal 140 will therefore be of a type suitable for use in transmission of color television chrominance information.

What is claimed is:

1. In a color television signal demodulating circuit the combination of: a source of carrier signal amplitude modulated by a composite color television signal, said composite color television signal occupying a given video spectrum and including a luminance component and a chrominance component, said chrominance component in turn being represented by an amplitude and phase modulated color subcarrier having a nominal video frequency value falling in the upper portion of said video spectrum; a transformer having a primary and secondary winding; means coupled to said carrier signal source for applying said modulated carrier signal across said primary winding; a unidirectional conduction path means connected in shunt with at least a portion of said secondary winding to form a detection loop; a source of continuous wave fixed frequency reference signal of a frequency value within said video spectrum and equal to the nominal frequency value of said color subcarrier; means connected with said reference signal source and said detection loop for interjecting said reference signal in series with said detection loop; and output means coupled with said detection loop for developing an output signal representing current flow in said detection loop.

2. In a signal demodulation circuit for color television signals the combination of: a source of carrier signal amplitude modulated by a composite color television signal, said composite color television signal occupying a given video spectrum and including a luminance component and a chrominance component, said chrominance component in turn being represented by an amplitude and phase modulated color subcarrier having a nominal video frequency value falling in the upper portion of said video spectrum; transformer means having a primary and a secondary winding; means coupled to said source for applying said modulated carrier signal across said primary winding; a transistor having a base, emitter and collector; connections placing at least a portion of said secondary winding between said base and said emitter to form a detection loop; a source of continuous wave fixed frequency reference signal of a frequency value within said video spectrum and equal to the nominal value of said color subcarrier; means connected in series with said detection loop and coupled with said reference signal source for interjecting said reference signal in series with said detection loop; and an output circuit connected between said collector and a point on said detection loop.

3. In a color television signal demodulating system the combination of: a source of carrier signal amplitude modulated by a composite color television signal, said composite color television signal occupying a given video spectrum and including a luminance component and a chrominance component said chrominance component in turn being represented by an amplitude and phase modulated color subcarrier having a nominal video frequency value falling in the upper portion of said video spectrum; a transformer having a primary winding and a secondary winding, said secondary winding having two extremities with a tap intermediate said extremities; means coupling said primary winding across said carrier signal source; a first and second unidirectional conduction path means each including a pair of electrodes, one member of each electrode pair being designated to receive positive polarity signals, the other negative polarity signals as a condition for conduction; a connection from one secondary winding extremity to the positive polarity electrode of the first conductor path means; a connection from the other secondary winding extremity to the negative polarity electrode of the second conduction path means; direct current conducting circuit path means connected between the other electrodes of said first and second conduction path means to form a closed detection loop; a load impedance means connected between said secondary winding tap and said direct current conducting circuit path means; a source of continuous wave fixed frequency reference signal of a frequency value within said video spectrum and equal to the nominal frequency value of said color subcarrier; and means connected with said continuous wave source and in series with at least one of said unidirectional conduction path means whereby a demodulated color information signal is developed in said load impedance means.

4. In a color television signal demodulating system the combination of: a source of carrier signal amplitude modulated by a composite color television signal, said composite color television signal occupying a given video spectrum and including a luminance component and a chrominance component said chrominance component in turn being represented by an amplitude and phase modulated color subcarrier having a nominal video frequency value falling in the upper portion of said video spectrum; a transformer having a primary winding and a secondary winding, said secondary winding having two extremities with a tap intermediate said extremities; means coupling said primary winding across said carrier signal source; a first and second unidirectional conduction path means each having a pair of electrodes, one member of said pair being designated to receive positive polarity signals, the other negative polarity signals as a condition for conduction; a connection from one secondary winding extremity to the positive polarity electrode of the first conductor path means; a connection from the other secondary winding extremity to the negative polarity electrode of the second conduction path means; direct current conducting circuit path means connected between the other electrodes of said first and second conduction path means to form a closed detection loop; a load impedance means connected between said secondary winding tap and said direct current conducting circuit path means; a source of continuous wave fixed frequency reference signal of a frequency value within said video spectrum and equal to the nominal frequency value of said color subcarrier; and means connected with said continuous wave source and in series with said load impedance means to interject said continuous wave signal in series with said load impedance to develop across said load impedance means a demodulated color information signal.

5. In a color television signal demodulating system the combination of: a source of carrier signal amplitude modulated by a composite color television signal, said composite color television signal occupying a given video spectrum and including a luminance component and a chrominance component, said chrominance component in turn being represented by an amplitude and phase modulated color subcarrier having a nominal video frequency value falling in the upper portion of said video spectrum; a transformer having a primary winding and a second winding, said secondary winding having two extremities with a tap intermediate said extremities; means coupling said primary winding across said carrier signal source; a first and second unidirectional conduction path means each including a pair of electrodes, one member of each electrode pair being designated to receive positive polarity signals the other negative polarity signals as a condition for conduction; a connection from one secondary winding extremity to the positive polarity electrode of the first conductor path means; a connection from the other secondary winding extremity to the negative polarity electrode of the second conduction path means; a first and second direct current conducting impedance means connected in series with one another to form an impedance combination; connection means placing said impedance combination between the other electrodes of said first and second conduction path means to form a closed detection loop defined by said secondary winding, said conduction path means and said impedance combination; a load impedance means connected between said secondary winding tap and said impedance combination at the junction of said first and said second impedance means; a source of continuous wave fixed frequency synchronous demodulating signal of a frequency value within said video spectrum and equal to the nominal frequency value of said color subcarrier; and means connected with said continuous wave source and in series with said load impedance means to interject said continuous wave fixed frequency synchronous demodulating signal in series with said load impedance means to develop across said load impedance means a demodulated color information signal, the ratio of impedance values of said first and second direct current conducting impedance means being such that said demodulated color information signal contains both luminance and chrominance information in a relative degree defining a direct color signal.

6. In a color television signal demodulating circuit the combination of: a first source of signal comprising a carrier signal amplitude modulated by a composite color television signal, said composite color television signal occupying a given video spectrum and including a luminance component and a chrominance component, said chrominance component in turn being represented by an amplitude and phase modulated suppressed color subcarrier having a nominal video frequency value falling in the upper portion of said video spectrum; a second source of signal comprising an unmodulated continuous wave of a frequency value equal to said nominal video frequency value of said color subcarrier; a transformer having a primary winding and a secondary winding, said secondary winding having a tap intermediate the extremities of said secondary winding; signal coupling means connected with said primary winding and said first source of signal for applying said first signal source across said primary winding; a first and a second semiconductor amplifying device each having electrodes corresponding to a base emitter and collector, said first semiconductor device having signal amplifying characteristics which are complementary to said second amplifying device; a connection from one secondary winding extremity and said first amplifying device base; a connection from the other extremity of said secondary winding and the base electrode of said second amplifying device; direct current conducting emitter connection means connected between the emitter of said first amplifying device and the emitter of said second amplifying device; a mixing impedance means connected from a point on said emitter connection means to said secondary winding tap; means connected with said second signal source and coupled with said mixing impedance means for developing across said mixing impedance means an electrical waveform representing said second signal; direct current potential supply means having two output terminals respectively connected with one of the collectors of said first and second amplifying devices with a polarity contributing to a reverse collector-base bias on each amplifying device, said potential supply means having an intermediate terminal with a potential intermediate the potentials of said two output terminals; and direct current conducting output load impedance means connected between a point on said emitter connection means and said intermediate terminal on said direct current potential supply means.

7. In a color television signal demodulating circuit the combination of: a first source of signal comprising a carrier signal amplitude modulated by a composite color television signal, said composite color television signal occupying a given video spectrum and including a luminance component and a chrominance component, said chrominance component in turn being represented by an amplitude and phase modulated suppressed color subcarrier having a nominal video frequency value falling in the upper portion of said video spectrum; a second source of signal comprising an unmodulated continuous wave of a frequency value equal to the nominal video frequency value of said color subcarrier; a transformer having a primary winding and a secondary winding, said secondary winding having a tap intermediate the extremities of said secondary winding; signal coupling means connected with said primary winding and said first source of signal for applying said first signal source across said primary winding; a first and a second semiconductor amplifying device each having electrodes corresponding to a base emitter and collector, said first semiconductor device having signal amplifying characteristics which are complementary to said second amplifying device; a connection from one secondary winding extremity and said first amplifying device base; a connection from the other extremity of said secondary winding and the base electrode of said second amplifying device; a first and second direct current conducting impedance means connected in series with one another to form an impedance combination; connections placing said impedance combination between the emitter of said first amplifying device and the emitter of said second amplifying device; a mixer impedance connected from the junction of said first and second serially connected impedance means to said secondary winding tap; means connected with said second signal source and coupled with said mixing impedance means for developing across said mixing impedance means an electrical waveform representing said second signal; direct current potential supply means having two output terminals respectively connected with one of the collectors of said first and second amplifying devices with a polarity contributing to a reverse collector-base bias on each amplifying device, said potential supply means having an intermediate terminal with a potential intermediate the potentials of said two output terminals; and direct current conducting output load impedance means connected between the junction between said first and second direct current conducting impedance means and said intermediate terminal on said direct current potential supply means, the ratio of the values of said first and second direct current conducting impedance means being such to provide across said output load impedance means a predetermined mixture of demodulated luminance component and synchronously demodulated chrominance component.

8. In a color television receiver including a source of carrier waves amplitude modulated by a composite television signal, said composite television signal occupying a given video spectrum and including a luminance component and a chrominance component, said chrominance component being represented by an amplitude and phase modulated color subcarrier having a nominal video frequency value falling in the upper portion of said video spectrum, and also including a source of an unmodulated reference signal of a frequency within said video spectrum and equal to the nominal frequency value of said color subcarrier, color demodulation apparatus comprising in combination a load impedance, a first unidirectionally conducting device, a second unidirectionally conducting device, each of said unidirectionally conducting devices being coupled in current delivering relationship to said load impedance, means for coupling said first unidirectionally conducting device to one of said signal sources such as to cause the current delivered by said first unidirectionally conducting device to said load impedance to vary in accordance with the signals of said one signal source in a first sense, means for coupling said second unidirectionally conducting device to said one signal source such as to cause the current delivered by said second unidirectionally conducting device to said load impedance to vary in accordance with the signals of said one source in a second sense opposite to said first sense, means for coupling said first unidirectionally conducting device to the other of said signal sources such as to cause the current delivered by said first unidirectionally conducting device to said load impedance to vary in accordance with the signals of said other source, means for coupling said second unidirectionally conducting device to said other signal source such as to cause the current delivered by said second unidirectionally conducting device to said load impedance to vary in accordance with the signals of said other source in the same sense as the current delivered by said first unidirectionally conducting device is varied in accordance therewith, and means for deriving from said load impedance an output signal representative of at least said chrominance component.

9. Apparatus in accordance with claim 8 additionally including means for controlling the magnitude of said luminance component, if any, developed across said load impedance said luminance component magnitude controlling means comprising a variable impedance connected in series with one of said unidirectionally conducting devices and one of said signal sources, the range of variation of said variable impedance including a value for said impedance at which substantially no luminance signal component is developed across said load impedance.

10. Apparatus in accordance with claim 8 wherein the means for coupling said first unidirectionally conducting device to a given one of said sources includes a first impedance, wherein the means for coupling said second unidirectionally conducting device to said given one of said sources includes a second impedance, and wherein means are provided for differentially varying said first and second impedances.

11. Apparatus in accordance with claim 8 wherein the means for coupling said first unidirectionally conducting device to a given one of said signal sources includes a first impedance of a given magnitude, and wherein the means for coupling said second unidirectionally conducting device to said given one of said signal sources includes a second impedance of a second magnitude differing from said given magnitude, the ratio of said second magnitude to said given magnitude being chosen to result in the production across said load impedance of a signal component corresponding to said luminance component which, in conjunction with a signal component representative of said chrominance component developed thereacross, results in the production thereacross of a component color signal for use by said utilization means.

References Cited in the file of this patent

UNITED STATES PATENTS

| | | |
|---|---|---|
| 2,718,546 | Schlesinger | Sept. 20, 1955 |
| 2,750,440 | Sziklai | Jan. 12, 1956 |